United States Patent
Guha et al.

(10) Patent No.: US 11,420,246 B2
(45) Date of Patent: Aug. 23, 2022

(54) METHOD FOR IMPROVING FATIGUE STRENGTH OF A WORKPIECE AND THE WORKPIECE THEREOF

(71) Applicant: Tata Steel Limited, Jharkhand (IN)

(72) Inventors: Suman Guha, Jamshedpur (IN); Rudra Bubai Sarkar, Jamshedpur (IN); Rahul Kumar Verma, Jamshedpur (IN); Gujre Vinay Sanjay, Jamshedpur (IN); Shaik Shamshoddin, Jamshedpur (IN)

(73) Assignee: TATA STEEL LIMITED, Jamshedpur (IN)

( * ) Notice: Subject to any disclaimer, the term of this patent is extended or adjusted under 35 U.S.C. 154(b) by 74 days.

(21) Appl. No.: 16/728,027

(22) Filed: Dec. 27, 2019

(65) Prior Publication Data

US 2020/0206795 A1  Jul. 2, 2020

(30) Foreign Application Priority Data

Dec. 27, 2018 (IN) .............................. 201833049476

(51) Int. Cl.
| | |
|---|---|
| *B21D 22/02* | (2006.01) |
| *B44B 5/00* | (2006.01) |
| *B44B 5/02* | (2006.01) |
| *C21D 9/00* | (2006.01) |
| *C21D 9/46* | (2006.01) |
| *B23P 9/00* | (2006.01) |
| *C21D 7/04* | (2006.01) |

(52) U.S. Cl.
CPC ............ *B21D 22/02* (2013.01); *B44B 5/0019* (2013.01); *B44B 5/0052* (2013.01); *B44B 5/026* (2013.01)

(58) Field of Classification Search
CPC ........ B21D 28/24; B21D 22/04; B21D 22/06; B21D 31/06; C21D 7/04; C21D 7/02; C21D 7/00; C22F 1/00; B23P 9/00; B23P 9/04; B24B 39/06; B24B 39/065; B44B 5/0019; B44B 5/0052; B44B 5/026
See application file for complete search history.

(56) References Cited

U.S. PATENT DOCUMENTS

| | | | |
|---|---|---|---|
| 6,711,928 B1 * | 3/2004 | Easterbrook .......... | B21C 23/001 29/525.06 |
| 2001/0052254 A1 * | 12/2001 | Easterbrook .......... | B21C 23/001 72/325 |

OTHER PUBLICATIONS

Szczepanski, Christopher J. University of Michigan, ProQuest Dissertations Publishing, 2008. 3343228. (p. 146, second paragraph, lines 3-4) (Year: 2008).*

* cited by examiner

*Primary Examiner* — Jessica Cahill
*Assistant Examiner* — Mohammed S. Alawadi
(74) *Attorney, Agent, or Firm* — Harness, Dickey & Pierce, P.L.C.

(57) ABSTRACT

The present disclosure discloses a method for improving fatigue strength of a workpiece (100). The method comprises positioning the workpiece (100) in a punch and die assembly (102). Operating the punch and die assembly (102) one or more times to imprint surface features (2) on a portion of a surface of the workpiece (100), wherein the surface features (2) induces compressive residual stresses at a subsurface level of the workpiece (100), and improves the fatigue strength of the workpiece (100).

10 Claims, 9 Drawing Sheets

METHOD FOR IMPROVING FATIGUE STRENGTH OF A WORKPIECE AND THE WORKPIECE THEREOF

TECHNICAL FIELD

Present disclosure generally relates to a field of manufacturing technology. Particularly, but not exclusively the present disclosure relates a method and apparatus for improving fatigue strength of a workpiece.

BACKGROUND OF THE DISCLOSURE

Generally, in manufacturing industries, workpieces such as but not limiting to ingots, sheet materials and the like are used for manufacturing a product of desired dimensions. Manufacturing such a desired product may include use of single or multiple machining processes such as but not limiting to forming, stamping, blanking and like.

Over the decades, realization to conserve energy resources has been paramount in the manufacturing sector. To cater to such requirements, manufacturing industries have shifted focus on utilising cutting-edge technologies which are energy efficient for manufacturing the desired product, while maintaining quality. Particularly, in sheet metal manufacturing industries, everchanging safety regulations and demanding needs of clients are to be achieved in order to stay ahead of competition. In the automotive industry, manufacturers utilise, cutting edge techniques to obtain materials for automotive parts with high-strength to weight ratio. In other words, manufacturing lightweight components helps in weight reduction of the entire automobile, which inherently improves fuel economy and performance of an automobile. However, such weight reductions may compromise the safety standards of the vehicle which may be undesirable.

A standard workpiece with a base material which has not undergone any improvement in its material characteristics may be susceptible to failure due to poor fatigue life characteristics, which is undesirable. Also, the standard workpiece may fail prematurely when a number of fatigue cycles of higher stress levels are induced. In order to improve the fatigue life and fatigue strength characteristics of the standard workpiece, a number of techniques are employed during manufacturing of the workpiece.

Several conventional techniques such as shot peening processes and laser peening processes are carried out in increasing the fatigue strength of the workpiece. These processes involve additional process steps in achieving improved fatigue strength within the workpiece. This additional manufacturing process step may increase the overall cost of manufacture of the workpiece. Moreover, laser peening technique is one such process which involves forming precision indentations on the workpiece through introduction of shockwaves within a surface area of the workpiece. Due to plastic deformation and induction of shockwaves, compressive forces within the workpiece may be generated which increases the fatigue strength of the workpiece. However, this manufacturing process may require the entire workpiece to be moved from a rolling or platform to a laser peening platform or shot peening platform which in many cases stalls the manufacturing process.

Additional, manufacturing set-ups need to be established within the manufacturing unit in order to perform peening operations on the workpiece to attain increased fatigue strength which may increase costs of the entire manufacturing process.

The present disclosure is directed to address one or more problems as discussed above.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE DISCLOSURE

One or more drawbacks of conventional method for improving fatigue strength of a workpiece is overcome, and additional advantages are provided through a method as claimed in the present disclosure. Additional features and advantages are realized through the technicalities of the present disclosure. Other embodiments and aspects of the disclosure are described in detail herein and are considered to be a part of the claimed disclosure.

In one non-limiting embodiment of the present disclosure, a method for improving fatigue strength of a workpiece is disclosed. The method includes positioning the workpiece in a punch and die assembly. Operating the punch and die assembly to imprint surface features one or more times on a portion of a surface of the workpiece, wherein the surface features induces compressive residual stresses at a sub-surface level of the workpiece, and improve the fatigue strength of the workpiece.

In an embodiment, the surface features are formed by plastic deformation.

In an embodiment, the workpiece with surface features, withstands about 400 times more fatigue cycles when compared to the number fatigue cycles which the workpiece without the surface features withstands at 423 MPA of applied stress.

In an embodiment, the workpiece with surface features, withstands about 10 times more fatigue cycles when compared to the number of fatigue cycles which the workpiece without the surface features withstands at 400 MPa of applied stress.

In an embodiment, the workpiece with surface features, withstands about 3 times more fatigue cycles when compared to the number of fatigue cycles which the workpiece without the surface features withstands at 376 MPa of applied stress.

In an embodiment, the workpiece with improved fatigue strength has an increased endurance limit in the range of 8% to 20% when compared to the workpiece without surface features.

In an embodiment, depth of the surface features imprinted on the portion of the surface of the workpiece are in the range of 20 μm to 30 μm.

In an embodiment, at least one template mesh is provided selectively on the portion of the surface of the workpiece to imprint the surface features. A configuration of the at least one template mesh is defined on a punch and the configuration of the at least one template mesh is defined on a die.

In an embodiment, the at least one template mesh includes, mounting the at least one template mesh on the punch and the die to form the surface features on the workpiece.

In another non-limiting embodiment, a workpiece is disclosed. The workpiece comprises the surface feature formed by plastic deformation induced by operating a punch and die assembly. The workpiece is configured with an increased fatigue strength, greater than 100% in comparison to the workpiece without the surface features.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended description. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE DISCLOSURE

While the embodiments of the disclosure are subject to various modifications and alternative forms, specific embodiment thereof have been shown by way of example in the figures and will be described below. It should be understood, however, that it is not intended to limit the disclosure to the particular forms disclosed, but on the contrary, the disclosure is to cover all modifications, equivalents, and alternative falling within the scope of the disclosure.

It is to be noted that a person skilled in the art would be motivated from the present disclosure to arrive at a method for improving fatigue strength of a workpiece and an apparatus thereof. The method for improving fatigue strength of the workpiece and the apparatus may vary based on configuration of the workpiece. However, such modifications should be construed within the scope of the disclosure. Accordingly, the drawings illustrate only those specific details that are pertinent to understand the embodiments of the present disclosure, so as not to obscure the disclosure with details that will be clear to those of ordinary skill in the art having benefit of the description herein.

The terms "comprises", "comprising", or any other variations thereof used in the disclosure, are intended to cover a non-exclusive inclusion, such that a device, system, assembly that comprises a list of components does not include only those components but may include other components not expressly listed or inherent to such system, or assembly, or device. In other words, one or more elements in a system or device proceeded by "comprises . . . a" does not, without more constraints, preclude the existence of other elements or additional elements in the system or device.

The present disclosure provides a method for improving fatigue strength of a workpiece. The method comprises positioning the workpiece in a punch and die assembly and operating the punch and die assembly such that, surface features are imprinted one or more times on a portion of the surface of the workpiece. The surface features are formed by plastic deformation which improves fatigue strength of the workpiece. The punch and die assembly imprints the surface features by using at least one template mesh. The at least one template mesh may be provided selectively on the portion of the surface of the workpiece, so that the surface features are formed corresponding to the configuration of the at least one template mesh. In an embodiment, the at least one template mesh may be mountable to the punch and die assembly, to form the surface features on the workpiece.

The present disclosure also provides an apparatus for improving fatigue strength of the workpiece. The apparatus comprises the punch and die assembly mountable on a press. The punch and die assembly comprises a top bolster connected to the punch and a bottom bolster connected to the die. The die is configured to position the workpiece, so that the surface features are formed on the workpiece, upon operation of the punch and die assembly one or more times. The surface features are formed due to plastic deformation, thereby improving the fatigue strength of the workpiece. According to some embodiments of the disclosure, at least one template mesh is mountable on at least one of the punch and the die, to form the surface features. In an embodiment, the punch and the die may include configuration of the at least one template mesh to form the surface features, without utilizing the at least one template mesh. The punch and the die may include a configuration of the at least one template mesh to form the surface features. This configuration of the apparatus upon operation forms the surface features, which increases fatigue strength of the workpiece greater than 100% in comparison to the fatigue strength of the workpiece without the surface features.

The present disclosure is configured to improve fatigue strength of the workpiece by imprinting surface features. This method of manufacturing enables imprinting the surface features on any portion of the workpiece, and is therefore versatile, while being time efficient and economical. The method of the present disclosure also eliminates the need for expensive equipment for forming the surface features.

The following paragraphs describe the present disclosure with reference to FIGS. 1 to 9. In the figures, the same element or elements which have similar functions are indicated by the same reference signs.

Figure 1:
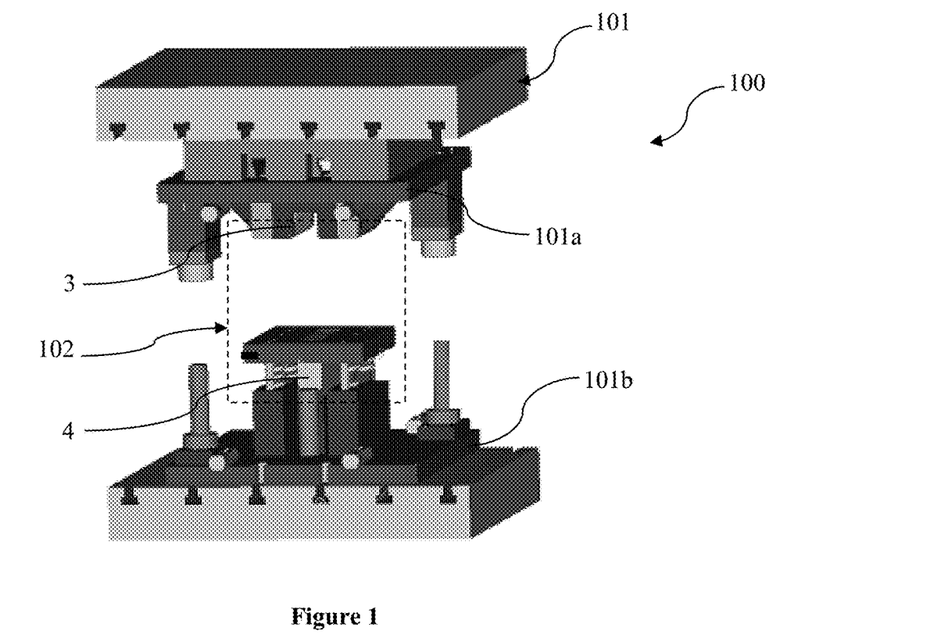
FIG. 1 illustrates an apparatus for forming surface features on the workpiece, in accordance with an embodiment of the present disclosure.

FIG. 1 is an exemplary embodiment of the present disclosure which illustrates a perspective view of an apparatus (100) for imprinting surface features (2) which improves fatigue strength of a workpiece (1).

Figure 2:
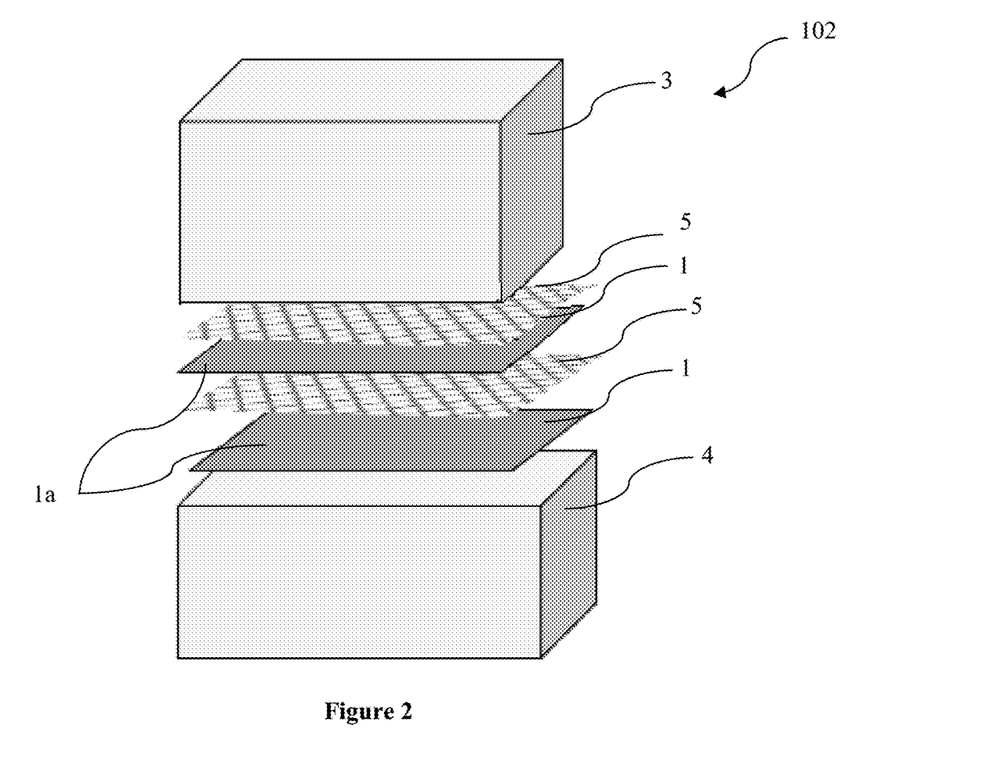
FIG. 2 illustrates a punch and die assembly connectable to the apparatus of FIG. 1 in accordance with an embodiment of the present disclosure.

The apparatus (100) comprises a punch and die assembly (102) [refer to FIG. 2] configured to be mountable on a press (101) such as a hydraulic press or a pneumatic press. The punch and the die assembly (102) comprises a top bolster (101a) connectable to a punch (3) and a bottom bolster (101b) connectable to a die (4). The die (4) is configured to receive and position the workpiece (1) in the punch and die assembly (102). This configuration enables formation of the surface features (2) [refer to FIG. 4] on the workpiece (1) upon operation of the punch and die assembly (102). The surface features (2) are formed by plastic deformation of the workpiece (1), to improve fatigue strength. The punch and die assembly (102) upon operation applies compressive forces on the workpiece (1) which induces compressive residual stresses at sub-surface level of the workpiece (1). The compressive residual forces aid in compaction of the workpiece (1) thereby preventing any kind of crack propagation within the workpiece (1) and ultimately improves the fatigue strength of the workpiece (1).

In an embodiment, the apparatus (100) may include at least one template mesh (5) is [as shown in FIGS. 2] which may be selectively provided on at least one surface (1a) of the workpiece (1) to imprint desired surface features (2). The at least one surface (1a) may refer to any surface on the workpiece (1) feasible for forming the surface features (2), based on cross-section of the workpiece (1). As an illustration, the at least one surface (1a) in FIG. 2 refers to the top surface of the workpiece (1).

Figure 3:
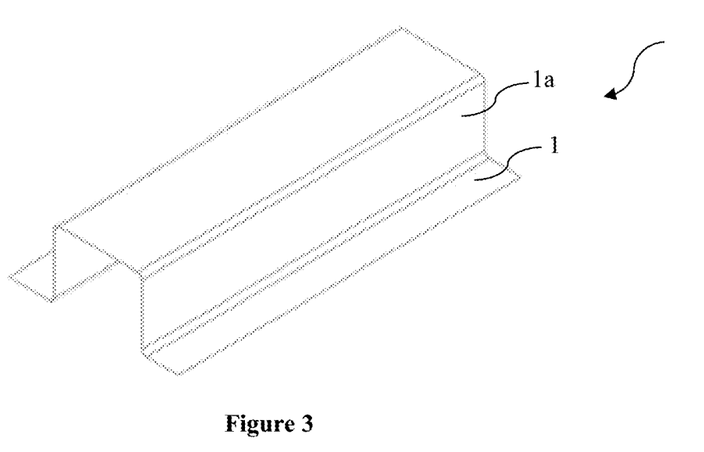
FIG. 3 illustrates the workpiece, in accordance with an embodiment of the present disclosure.
Figure 4:
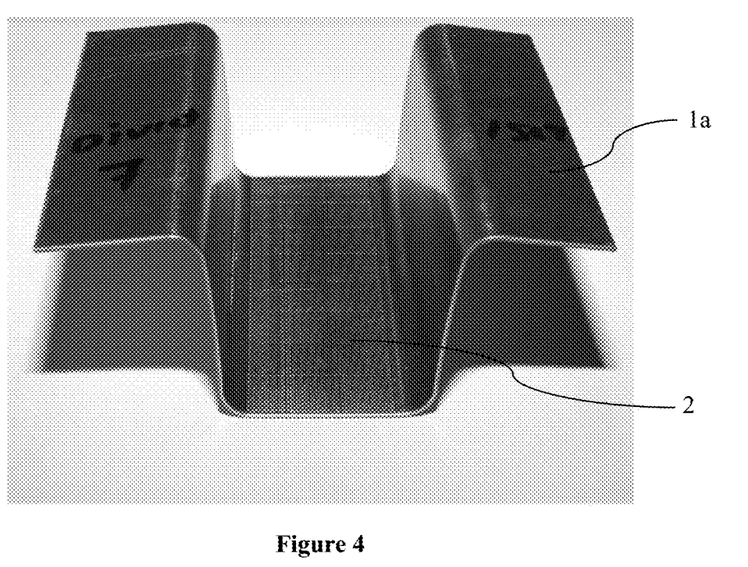
FIG. 4 illustrates the workpiece formed with surface features, in accordance with an embodiment of the present disclosure.
Figure 5:
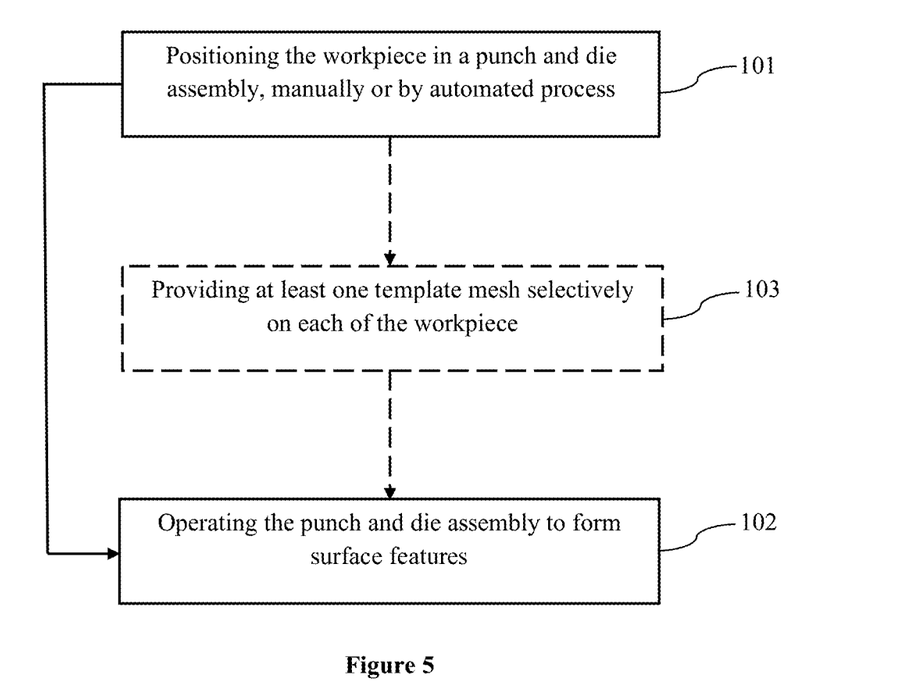
FIG. 5 illustrates a flow chart of a method of improving fatigue strength of the workpiece, in accordance with an embodiment of the present disclosure.
Figure 6:
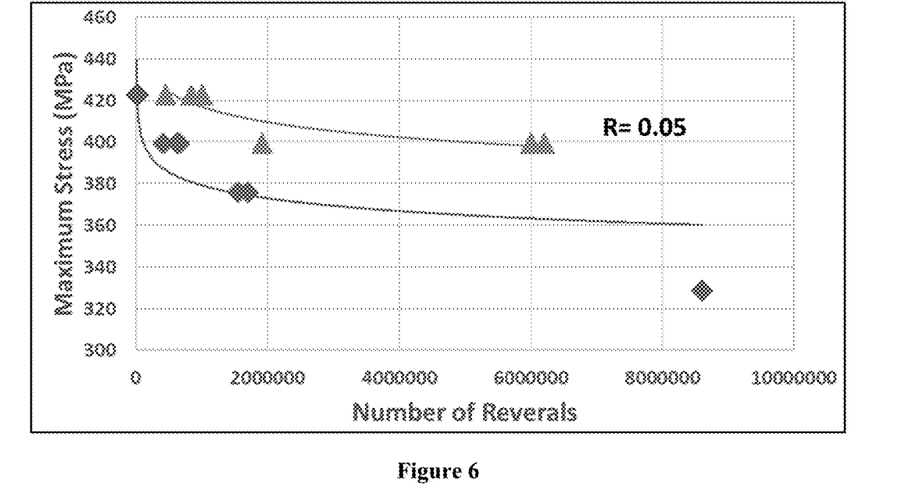
FIG. 6 illustrates a graph depicting fatigue results at varying stress levels between the workpiece with imprinted surface features and the workpiece without surface features, in accordance with an embodiment of the present disclosure.

In an exemplary embodiment, a U profiled workpiece [as shown in FIG. 3] is disclosed. The workpiece (1) may be suitably located or positioned within the punch and die assembly (102). The punch (3) may be operated to apply compressive forces on the workpiece (1) for forming the surface features (2). In an embodiment, the at least one template mesh (5) may be provided on an inner surface of the workpiece (1) to form the surface features (2) on the inner surface of the workpiece (1) [as shown in FIG. 5]. Further, one or more template meshes (5) may be provided on any of the at least one surface (1a) of the workpiece (1) to form the surface features (2) on different faces of the workpiece (1). In an exemplary embodiment, the at least one template mesh (5) may be provided above the workpiece (1) for forming the surface features (2). The at least one template mesh (5) may also be provided on a portion of the at least one surface (1a) of the workpiece (1) to form the surface features (2) based on the requirement. The at least one template mesh (5) imprints the configuration of the surface features (2) on the workpiece (1) upon application of load via the punch and die assembly (102). This imprinting process may be carried out one or more times, until the desired surface features (2) are obtained on the portion of the workpiece (1). The at least one template mesh (5) may be configured with a material strength greater than the workpiece (1), to prevent deformation of the at least one template mesh (5) on the workpiece (1) upon application of load.

This configuration therefore, ensures that the surface features (2) are formed having a configuration of the at least one template mesh (5).

In an embodiment, providing the at least one template mesh (5) on the workpiece (1) may refer to the at least one template mesh (5) being fastened on the workpiece (1) to prevent misalignment during operation of the punch and die assembly (100). The at least one template mesh (5) may also be mountable on the punch (3) and the die (4), to ensure formation of the surface features (2) on the workpiece (1) without providing the at least one template mesh (5). A slot [not shown in Figures] may be provided to the punch (3) and the die (4) for receiving and holding the at least one template mesh (5). A fastening mechanism [not shown in Figures] such as a bolt and nut arrangement, a snap-fit arrangement and the like may be provided to the punch (3) and the die (4) for receiving and holding the at least one template mesh (5). This configuration, ensures cassette type replacement of the at least one template mesh (5) in the punch (3) and the die (4), based on design requirement of the type of surface features (2) required to be imprinted on the workpiece (1). Further, this configuration also ensures that, bare or plain configuration of the punch (3) and the die (4) may also be used to plastically deform the portion of the surface of the workpiece (1) without utilising the configuration of the at least one template mesh (5), thereby increasing the fatigue strength of the workpiece (1).

In an embodiment, the configuration of the at least one template mesh (5) may be defined on the punch (3) and die (4), so that the surface features (2) are formed on the workpiece (1), even in the absence of the at least one template mesh (5). In another embodiment, varying configurations of the surface features (2) that need to be imprinted on the workpiece (1) may be defined on the punch (3) and the die (4), so that each portion of the workpiece (1) are induced with different configuration of the surface features (2) based on the requirement. This configuration ensures that the surface features (2) are obtained by operation of the punch (3) and the die (4) which corresponds to that of the configuration of the at least one template mesh (5).

In an embodiment, the die (4) includes a securing means [not shown in Figures] for securely positioning the workpiece (1) during operation of the punch and die assembly (102), to prevent unintended movement. In an embodiment, the securing means may be selected from at least one of fasteners, a snap-fit arrangement and the like which serves the purpose of securing the workpiece (1). In an embodiment, the die (4) may include a support member (not shown in figures) for holding the workpiece (1).

In an embodiment, the top bolster (101a) and the bottom bolster (101b) of the press (101) includes a mechanism [now shown in Figures] for connecting the punch (3) and the die (4) before use. This mechanism, enables to detach the punch (3) and the die (4), during non-operational condition of the apparatus (100). In an embodiment, different punch (3) and die (4) combinations, for forming the surface features (2), based on feasibility and requirement may be mounted to the press (101). The mechanism may be selected from at least one of a fastening mechanism, a snap-fit mechanism, a sliding mechanism or any other mechanism which serves the purpose of connecting the punch (3) to the top bolster (101a) and the die (4) to the bottom bolster (101b).

In an embodiment, the workpiece (1) may be selected with material properties including sufficient ductility so that, the workpiece (1) can undergo plastic deformation, instead of fracture upon loading. Further, the workpiece (1) is selected from at least one of a steel sheet, an aluminium sheet, a stainless-steel sheet or any other sheet based on the requirement. Also, the workpiece (1) is selected from at least one of a bare workpiece, a forming workpiece, a formed workpiece, a heat-treated workpiece or any other workpiece.

In an embodiment, the surface features (2) are formed due to the strain hardening effect induced by plastic deformation. The strain hardening induces size effect on the surface of the workpiece (1), thereby forming a configuration of the at least one template mesh (5) on the workpiece (1). This configuration ensures that the surface available for receiving or contacting the load is minimised, thereby preventing deformation, which inherently improves fatigue strength of the workpiece (1). Also, compressive residual stresses are induced within the workpiece (1) at a sub-surface layer, which prevents crack propagation within the workpiece (1) and increases the fatigue strength of the workpiece (1).

In an embodiment, the workpiece (1) may be a sheet material with thickness ranging from about 0.25 mm to about 2 mm. In an another embodiment, the workpiece (1) may be selected from at least one of a hot-rolled sheet material and a cold-rolled sheet material.

In an embodiment, the punch (3) and the die (4) may be made of tool grade steel material of D2 grade, which is harder than the workpiece (1).

FIG. 5 in one exemplary embodiment of the present disclosure, illustrates a flow chart of a method for improving fatigue strength of the workpiece (1).

In step 101 the workpiece (1) is positioned securely in the punch and the die assembly (102), by suitable mechanism, to prevent misalignment during operation of the punch and die assembly (102).

In step 102, the punch and die assembly (102) is operated one or more times by the press (101) to displace the punch towards the die (4). Operation of the punch and die assembly (102) includes stamping one or more times by the punch (3) on the workpiece (1) directly to form surface features (2) or by using the at least one template mesh (5), for imprinting the surface features (2) one or more times on the portion of the workpiece (1). The surface features (2) are formed due to plastic deformation of the workpiece (1) by application of the load. The surface features (2) may be formed corresponding to the configuration of the punch (3) and the die (4) or the at least one template mesh (5). In an embodiment, the surface features (2) formed over the at least one surface (la) is configured to be at least one of symmetrical configuration and asymmetrical configuration.

That is, the size of the surface features (2) so imprinted on the workpiece (1) may be equal or unequal based on design feasibility and requirement.

In step 103, the at least one template mesh (5) may be provided in the punch and die assembly (102) such that, the at least one template mesh (5) may be placed selectively on the at least one surface (la) of the workpiece (1). The at least one template mesh (5) is configured to imprint surface features (2) of its configuration on the at least one surface (la). This provision therefore, further simplifies the process of imprinting the surface features (2) one or more times on a portion of the workpiece (1).

In an embodiment, the workpiece (1) may be positioned in the punch and the die assembly (102) either manually by a user or automatically by an automated system such as a robotic arm in step 101.

Referring to FIG. 5, the improvement in fatigue strength of the workpiece (1) is illustrated. As per the representation, provision of the surface features (2) on the workpiece (1) has significantly improved the fatigue strength of the workpiece (1) by more than 100%. Formation of the surface features (2) due to plastic deformation induces compressive residual stresses in the sub-surface level of the workpiece (1) which leads to compaction of the workpiece (1). Such compaction increases concentration of the material molecules thereby leading to increased fatigue strength of the workpiece (1). The improvement of the fatigue strength of the workpiece (1) is due to the phenomenon of strain hardening, which further induces the size effect phenomenon. From the graph, a comparative analysis between the workpiece without surface features (2) and the workpiece with surface features (2) is disclosed. The workpiece (1) with surface features (2) has a higher number of fatigue cycles in comparison with the workpiece without surface features (2).

Further, at particular stress levels [e.g. 400 MPa to about 430 MPa] the number of fatigue cycles for the workpiece with surface features (2) is almost 8% to 10% more than the workpiece without surface features (2).

Figure 7:
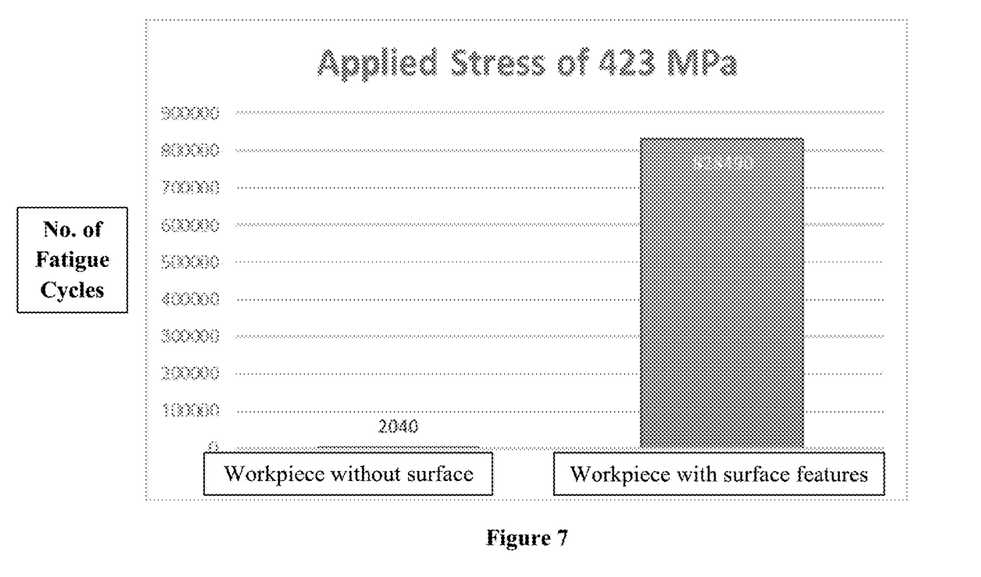
FIG. 7 illustrates fatigue life comparison between the workpiece with imprinted surface features and the workpiece without surface features at 423 MPa, in accordance with an embodiment of the present disclosure.

Referring now to FIG. 7, which depicts fatigue life comparison between the workpiece without surface features (2) and the workpiece with surface features (2) at 423 MPa applied stress level. The number of fatigue cycles before failure of the workpiece (1) with surface features (2) is greater than 400 times the number of fatigue cycles before failure of the workpiece (1) without surface features (2). Also, the percentage increase in fatigue cycles is about 40,500% in comparison with the workpiece (1) without surface features (2).

Figure 8:
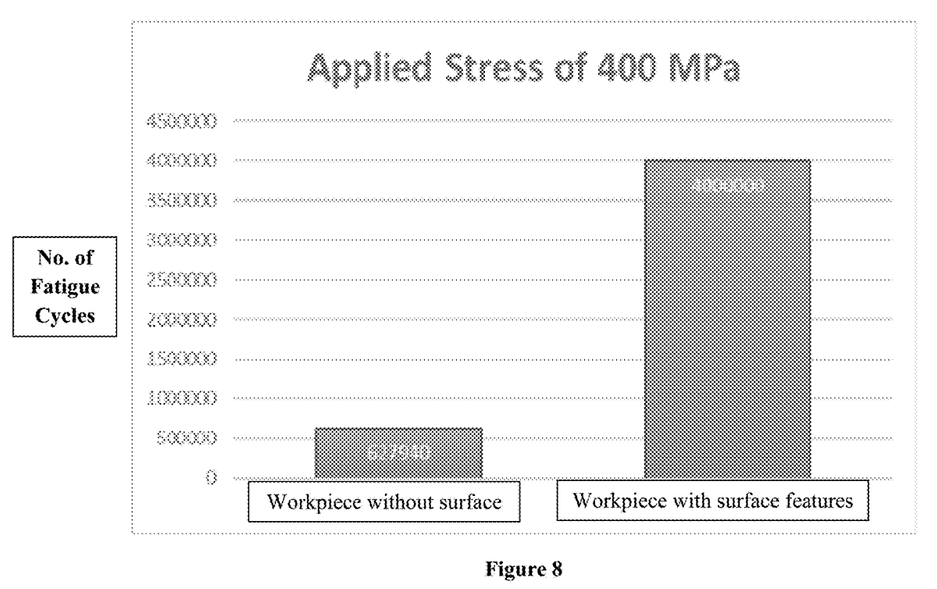
FIG. 8 illustrates fatigue life comparison between the workpiece with imprinted surface features and the workpiece without surface features at 400 MPa, in accordance with an embodiment of the present disclosure.

FIG. 8 discloses comparison between the workpiece (1) without surface features (2) and the workpiece with surface features (2) at 400 MPa stress level. The number of fatigue cycles before failure of the workpiece (1) with surface features (2) is almost 10 times more than the number of fatigue cycles before failure of the workpiece (1) without surface features (2). Also, the percentage increase in fatigue cycles is greater than 500% in comparison with the workpiece (1) without surface features (2).

Figure 9:
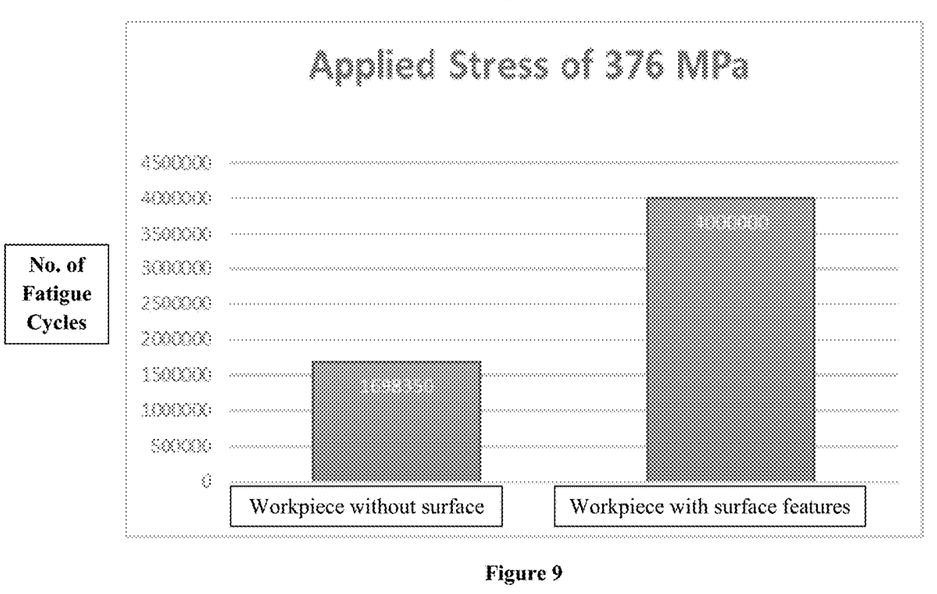
FIG. 9 illustrates fatigue life comparison between the workpiece with imprinted surface features and the workpiece without surface features at 376 MPa, in accordance with an embodiment of the present disclosure.

FIG. 9 discloses comparison between the workpiece (1) without surface features (2) and the workpiece with surface features (2) at 376 MPa stress level. The number of fatigue cycles before failure of the workpiece (1) with surface features (2) is almost 3 to 4 times more than the number of fatigue cycles before failure of the workpiece (1) without surface features (2). Also, the percentage increase in fatigue cycles is greater than 130% in comparison with the workpiece (1) without surface features (2).

Therefore, from the above, it is clear that the workpiece (1) with increased fatigue strength has higher number of fatigue cycles at higher stress levels in comparison with the workpiece (1) without improved fatigue strength.

Figure 10A:
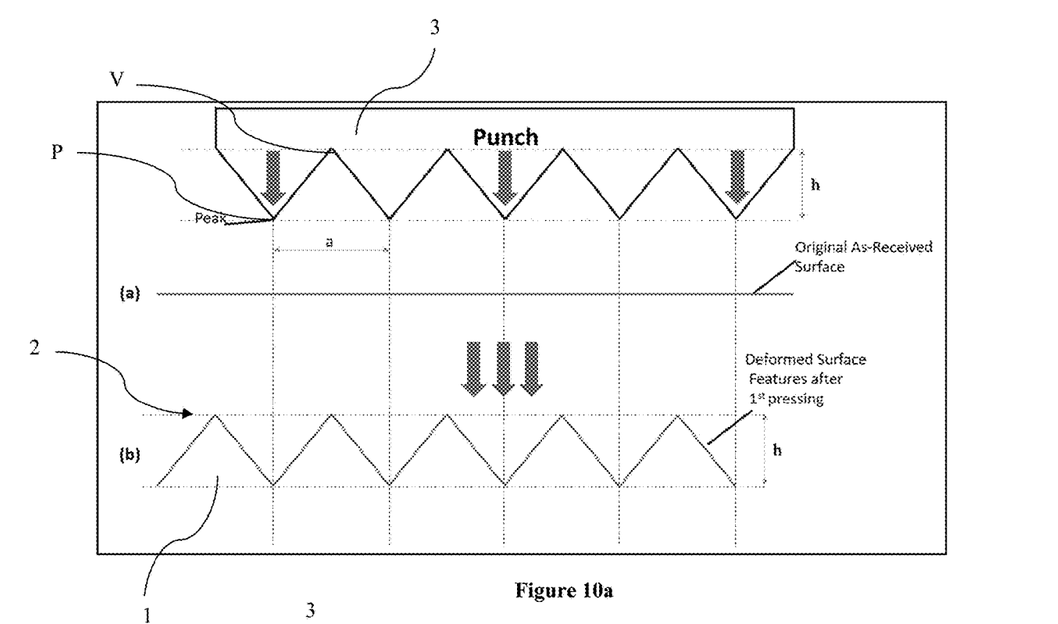
FIG. 10a illustrates a schematic view of a pressing operation on the workpiece by the press to form surface features, in accordance with an embodiment of the present disclosure.

FIG. 10a illustrates pressing operation by the punch and die assembly (102) one or more times on the workpiece (1) to form surface features (2). The punch and die assembly (102) is operated one or more times by the press (101) to displace the punch (3) towards the workpiece (1). The workpiece (1) initially has no surface features (2), as and when the punch (3) is brought down on a surface of the workpiece (1), surface features (2) are formed due to plastic deformation. In an exemplary embodiment, the punch (3) may be configured with plurality of peaks (P) and plurality of valleys (V). Once the punch (3) is pressed on the surface of the workpiece (1) by the press (101), the surface features (2) similar to that of the configuration of the punch (3) are formed on the workpiece (1). In this case, surface features (2) formed on the workpiece (1) are of plurality of peaks (P') and plurality of valleys (V'). The surface features (2) so formed on the workpiece (1) have a pitch (peak to peak) equal to "a" and height "h" (peak to base).

Figure 10B:
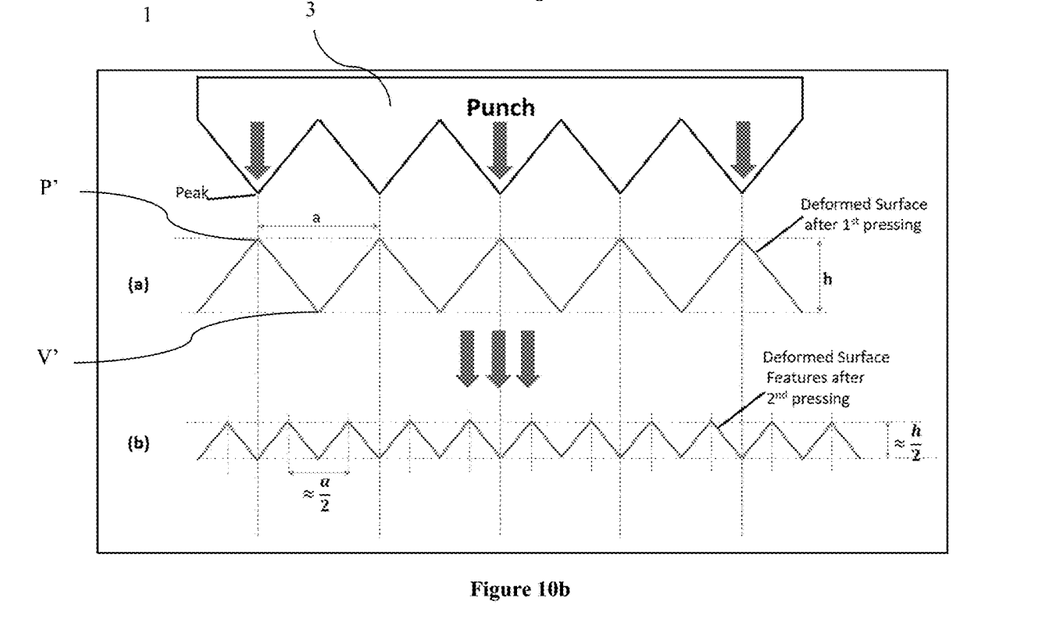
FIG. 10b illustrates a schematic view of the surface features on the workpiece after completion of the pressing operation, in accordance with an embodiment of the present disclosure.

FIG. 10b illustrates formation of surface features (2) on the workpiece (1) after completion of the pressing operation by the punch (3). As an example, the workpiece (1) may be subjected to multiple pressing operations. Once the surface features (2) are formed on the workpiece (1), the punch (3) may be realigned in such a way that the plurality of peaks (P') formed on the workpiece (2) is matched with the plurality of peaks (P) provided on the punch (3). The workpiece (1) is subjected to pressing operations once again or multiple times. The deformed surface features (2) on the workpiece (1) has the pitch "a" which is nearly half that of the original surface i.e. a/2. Also, the height "h" which is nearly half that of the original surface h/2. Similarly, multiple pressing operations on the workpiece (1) with the surface features (2) may be carried out. Geometrical figures or surface features (2) so formed on the surface of the workpiece (1) after multiple iterations of pressing operations may keep on decreasing. Moreover, the pressing operation on the plurality of peaks (P') formed on the workpiece (1) may be performed at any location along the pitch "a".

Further, it has been validated experimentally and with simulation that increase in the fatigue life of the workpiece (1) with micro-pillared surface is higher when compared to as-received workpiece (1). The phenomenon of increments in fatigue life is due to generation of compressive residual stresses in the workpiece (1) due to micro-pillaring which is also validated by finite element simulations. It is also observed from an example simulation that the compressive residual stresses increases with multiple pressing operations. Thus, the same process demonstrated in FIGS. 10a and 10b can be repeated multiple times to raise the level of residual stresses till the final height of the surface features (2) becomes equal to the order of surface roughness.

Figure 11:
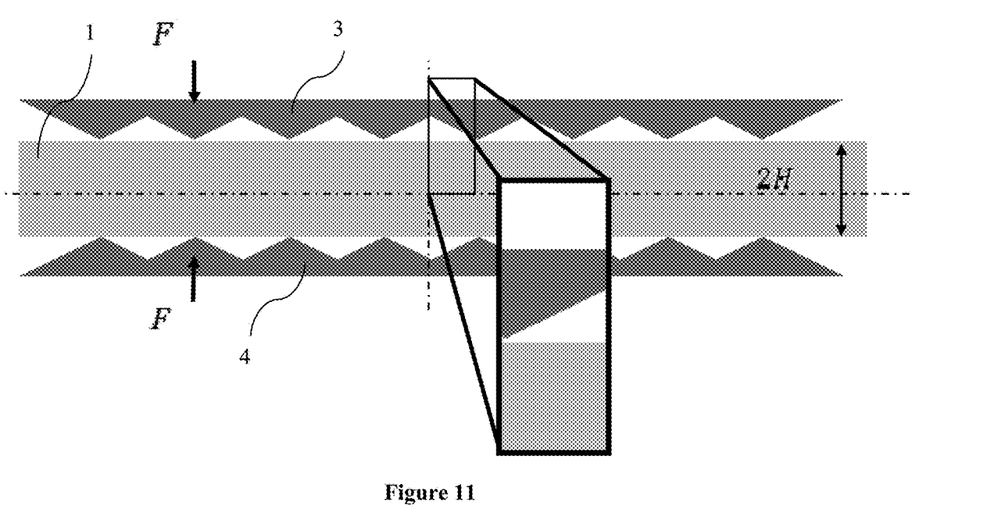
FIG. 11 illustrates a schematic view of a pressing operation on the workpiece by a punch from both the sides of the workpiece, in accordance with an embodiment of the present disclosure.
Figure 12:
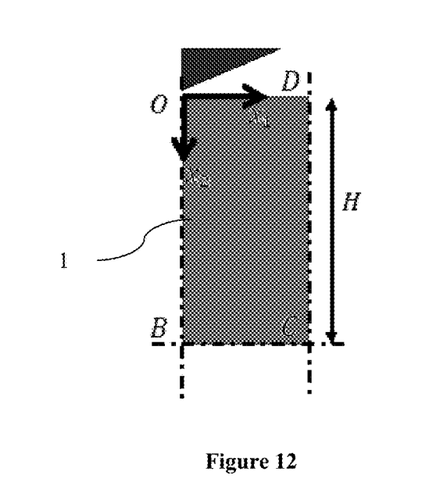
FIG. 12 illustrates a section of the workpiece being pressed on two sides to determine residual stress distribution within the workpiece, in accordance with an embodiment of the present disclosure.

FIG. 11 illustrates pressing operation on the workpiece by a punch and die assembly (102) configured to form surface features (2) on two faces of the workpiece (1). Through finite element simulations, it is clear that, the pressing operation with a featured punch (3) on the surface of the workpiece (1) generates high levels of compressive residual stress. In order to simplify the problem the following assumptions are made. The workpiece (1) is pressed from both sides [i.e. on two faces of the workpiece (1)] and prediction of the residual stress distribution after the punch (3) is withdrawn is carried out. A 2D plane strain problem assuming that, the out of plane dimension is comparatively much larger than the other dimensions and model only a part OBCD of the whole domain utilizing the symmetrical nature of the geometry and loading as shown in FIG. 12. The geometry and loading is symmetric about the axis OB, BC and DC. An analysis for a 3-step pressing operation is carried out and the results of the simulation are shown in FIGS. 13, 14 and 15.

Figure 13:
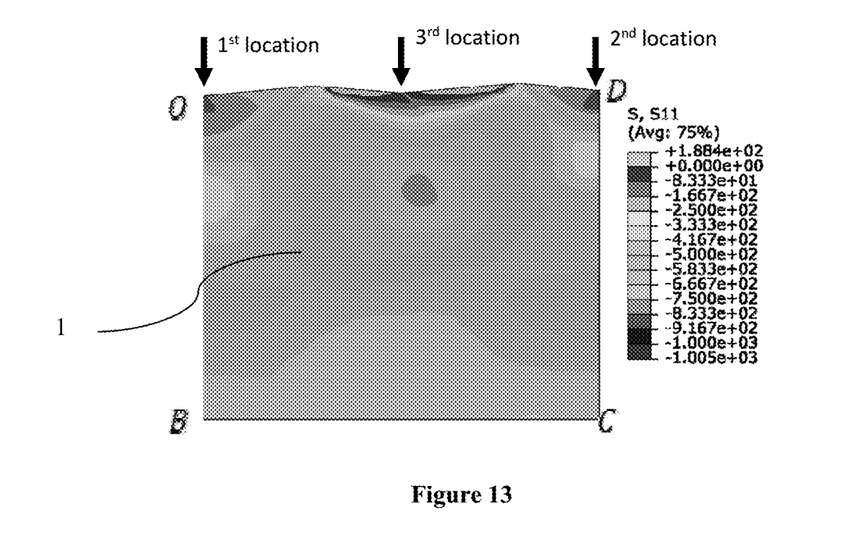
FIG. 13 illustrates contour and residual stress distribution of the work piece, in accordance with an embodiment of the present disclosure.

FIG. 13 illustrates contour and residual stress distribution of the workpiece (1), in accordance with an embodiment of the present disclosure. The contour plots of the residual stress component $\sigma_{11}$ after the third iteration of the micro-pillaring process is disclosed. The locations where the third micro-pillaring was performed have also been specified in this figure. It is evident that, a very high compressive residual stress (<900 MPa) is generated on the surface of the workpiece (1) as well as at the sub-surface level of the workpiece (1). Leaving only a small portion near the region of the third micro-pillaring location where the residual stress is tensile in nature, the rest of the domain is under compressive residual stress with an approximate average value of −500 MPa.

Figure 14:
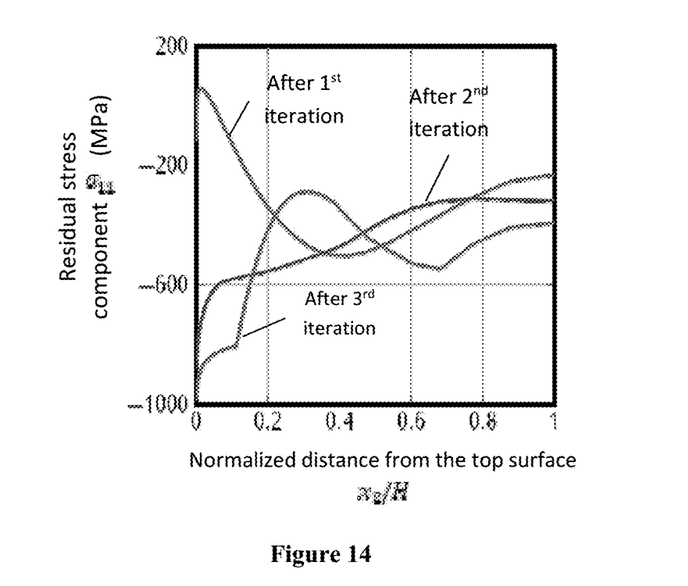
FIG. 14 illustrates a graph showing distribution of residual stresses for a section OB of the workpiece of FIG. 12.
Figure 15:
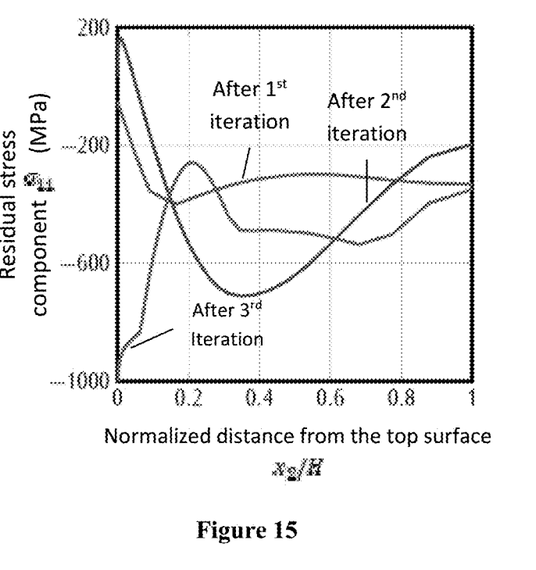
FIG. 15 illustrates a graph for distribution of residual stresses for a section DC of the workpiece of FIG. 12.

FIGS. 14 and 15 illustrates graphs of the distribution of the residual stress along the two surfaces OB and DC respectively after each step of the micro-pillaring process. It can be seen that the residual stress distribution for both the surfaces OB and DC after the first iteration of micro-pillaring operation is tensile in nature closer to the top surface and gradually changes to compressive as one proceeds towards the center from the top surface. However, the magnitude of the average compressive residual stress is not more than approximately 400 MPa for both the cases. For successive iterations of micro-pillaring, the residual stress distribution becomes more compressive specifically at the sub-surface level. After the third step, the residual stress becomes highly compressive near the top surface with a magnitude of approximately 1000 MPa. Although, the magnitude sharply drops towards the sub-surface level but the average remains quite high in comparison to the distributions after the previous two steps. As a crack cannot grow under a completely compressive stress field, the crack growth may be delayed during application of loads when the workpiece (1) has a compressive residual stresses in it. The above prediction of the compressive residual stress after micro-pillaring is responsible for the prolonged fatigue life in the micro-pillared samples obtained from these experiments. With multiple step micro-pillaring process the compressive residual stresses gains high magnitude and may result in improving the fatigue life of the workpiece (1) further.

Exemplary Experimental Results

Based on the method for improving fatigue strength of the workpiece (1) as described above, comparison of mechanical properties of the workpiece (1) after forming the surface features (2) is provided.

The parameters pertaining to the comparison of mechanical properties is tabulated in Table 1, provided below.

TABLE 1

| Applied Maximum Stress (MPa) | No of cycles to failure | | % increase |
|---|---|---|---|
| | Workpiece without surface features | Workpiece with surface features | |
| 423 | 2040 | 828490 | 40500 |
| 423 | 3972 | 996124 | 24900 |
| 400 | 627940 | >4000000 | >500 |
| 400 | 651498 | >4000000 | >500 |
| 376 | 1698350 | >4000000 | >130 |
| 376 | 1546978 | >4000000 | >150 |

First Set of Experiments

In this test, at 423 MPa for a base material [without surface features (2)] the number of cycles before material failure is 2040 cycles and for the workpiece (1) [i.e. featured specimen] with surface features (2) is 828490 cycles. The percentage increase in the number of cycles from the workpiece (1) with surface features (2) is 40,500% more than the workpiece (1) without surface features (2).

Similarly, various tests have been carried out at varying stress levels and it is clear that the workpiece (1) with improved fatigue strength has higher fatigue cycles in comparison with the workpiece (1) without improved fatigue strength.

In an embodiment, the formation of surface features (2) on the workpiece (1) using the punch and die assembly (102) improves the fatigue strength of the workpiece. This method provides a cost-effective solution for improving fatigue strength of the workpiece (1).

In an embodiment, the method of improving fatigue life of the workpiece (1) as disclosed in the present disclosure has fatigue life improvement which is greater than 100% in comparison with bare or conventional workpiece, without surface features (2) and fatigue strength improvement.

In an embodiment, the method to improve fatigue strength of the workpiece has enhanced physical and mechanical properties at desired locations has more number of fatigue cycles before failure in comparison with the workpiece (1) without improved fatigue strength. This improved feature in the workpiece (1) may be obtained without any additional manufacturing costs.

Equivalents

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Referral numerals | Description |
|---|---|
| 100 | Apparatus for improving fatigue strength of the workpiece |
| 101 | Press |
| 101a | Top Bolster |
| 101b | Bottom Bolster |
| 102 | Punch and die assembly |
| 1 | Workpiece |
| 2 | Surface features |
| 3 | Punch |
| 4 | Die |
| 5 | At least one template mesh |
| P | Plurality of peaks on the punch |
| V | Plurality of valleys on the punch |
| P' | Plurality of peaks on the workpiece |
| V' | Plurality of valleys on the workpiece |

We claim:

1. A method for improving fatigue strength of a workpiece, the method comprising:
   positioning the workpiece in a punch and die assembly;
   providing at least one template mesh selectively on a portion of at least one surface of a workpiece;
   operating the punch and die assembly one or more times to imprint surface features on a portion of a surface of the workpiece, by the at least one template mesh wherein the at least one template mesh is defined with a material strength greater than material strength of the workpiece; and
   wherein the surface features formed by the at least one template mesh induces compressive residual stresses at a sub-surface level of the workpiece, and improve the fatigue strength of the workpiece.

2. The method as claimed in claim 1, wherein the surface features are formed by plastic deformation.

3. The method as claimed in claim 1, wherein the workpiece with surface features, withstands about 400 times more fatigue cycles when compared to the number fatigue cycles which the workpiece without the surface features withstands at 423 MPA of applied stress.

4. The method as claimed in claim 1, wherein the workpiece with surface features, withstands about 10 times more fatigue cycles when compared to the number of fatigue cycles which the workpiece without the surface features withstands at 400 MPa of applied stress.

5. The method as claimed in claim 1, wherein the workpiece with surface features, withstands about 4 times more fatigue cycles when compared to the number of fatigue cycles which the workpiece without the surface features withstands at 376 MPa of applied stress.

6. The method as claimed in claim 1, wherein the workpiece with improved fatigue strength has an increased endurance limit in the range of 8% to 20% when compared to the workpiece without surface features.

7. The method as claimed in claim 1, wherein depth of the surface features imprinted on the portion of the surface of the workpiece are in the range of 20 μm to 30 μm.

8. The method as claimed in claim 1, wherein configuration of the at least one template mesh is defined on a punch.

9. The method as claimed in claim 1, wherein configuration of the at least one template mesh is defined on a die.

10. A workpiece processed by the method as claimed in claim 1, the workpiece comprising:
    the surface feature formed by plastic deformation induced by operating the punch and die assembly, wherein the workpiece is configured with an increased fatigue life, greater than 100% in comparison to the workpiece without the surface features.

* * * * *